United States Patent [19]

Kawasaki et al.

[11] Patent Number: 4,845,929
[45] Date of Patent: Jul. 11, 1989

[54] CUTTER-TRIMMER OF WALK-BEHIND TYPE

[75] Inventors: Masami Kawasaki; Keiichi Sanpei; Tetsuya Nishida, all of Osaka, Japan

[73] Assignee: Kubota Ltd., Osaka, Japan

[21] Appl. No.: 141,067

[22] Filed: Dec. 29, 1987

[30] Foreign Application Priority Data

Dec. 29, 1986 [JP] Japan ................. 61-311972
Dec. 29, 1986 [JP] Japan ................. 61-311974
Jan. 14, 1987 [JP] Japan ................. 62-7159
Jul. 16, 1987 [JP] Japan ................. 62-177885

[51] Int. Cl.⁴ ............................................. A01D 34/68
[52] U.S. Cl. ............................. 56/17.5; 56/255; 56/12.7
[58] Field of Search .......... 56/10.2, 10.8, 11.1, 56/11.2, 11.8, 17.5, 255, 16.7, 17.5

[56] References Cited

U.S. PATENT DOCUMENTS

| | | | |
|---|---|---|---|
| 2,263,431 | 11/1941 | White | 56/17.5 |
| 2,498,415 | 2/1950 | Gunther | 56/17.5 |
| 2,530,684 | 11/1950 | Davis | 56/11.2 |
| 2,770,085 | 11/1956 | Laughlin | 56/17.5 |
| 3,973,379 | 8/1976 | Ecker et al. | 56/11.2 |
| 4,033,098 | 7/1977 | Green | 56/17.5 |
| 4,084,395 | 4/1978 | Nannen | 56/17.5 |
| 4,245,455 | 1/1981 | Martin | 56/12.8 |
| 4,267,686 | 5/1981 | Heath | 56/12.7 |
| 4,559,768 | 12/1985 | Dunn | 56/16.9 |

FOREIGN PATENT DOCUMENTS

| | | | |
|---|---|---|---|
| 1161069 | 1/1964 | Fed. Rep. of Germany | 56/17.5 |
| 4815238 | 4/1973 | Japan . | |
| 1395661 | 5/1975 | United Kingdom | 56/16.7 |

Primary Examiner—John Weiss
Attorney, Agent, or Firm—Birch, Stewart, Kolasch, & Birch

[57] ABSTRACT

A cutter-trimmer comprising a drivingly rotatable cutter disposed at the front end of the body thereof, a guide handle disposed at the rear end of the body, a wheel member disposed in the vicinity of the cutter and reversibly rotatable about a horizontal axis for supporting the body thereon, and a cutter driving engine and a wheel member driving electric motor provided at a longitudinally intermediate portion of the body toward its front end. The device is adapted to perform a cutting operation while traveling forward, rearward or sideways by shifting the wheel member to a forward position or to a lateral position about a vertical axis and holding the wheel member in the shifted position.

35 Claims, 16 Drawing Sheets

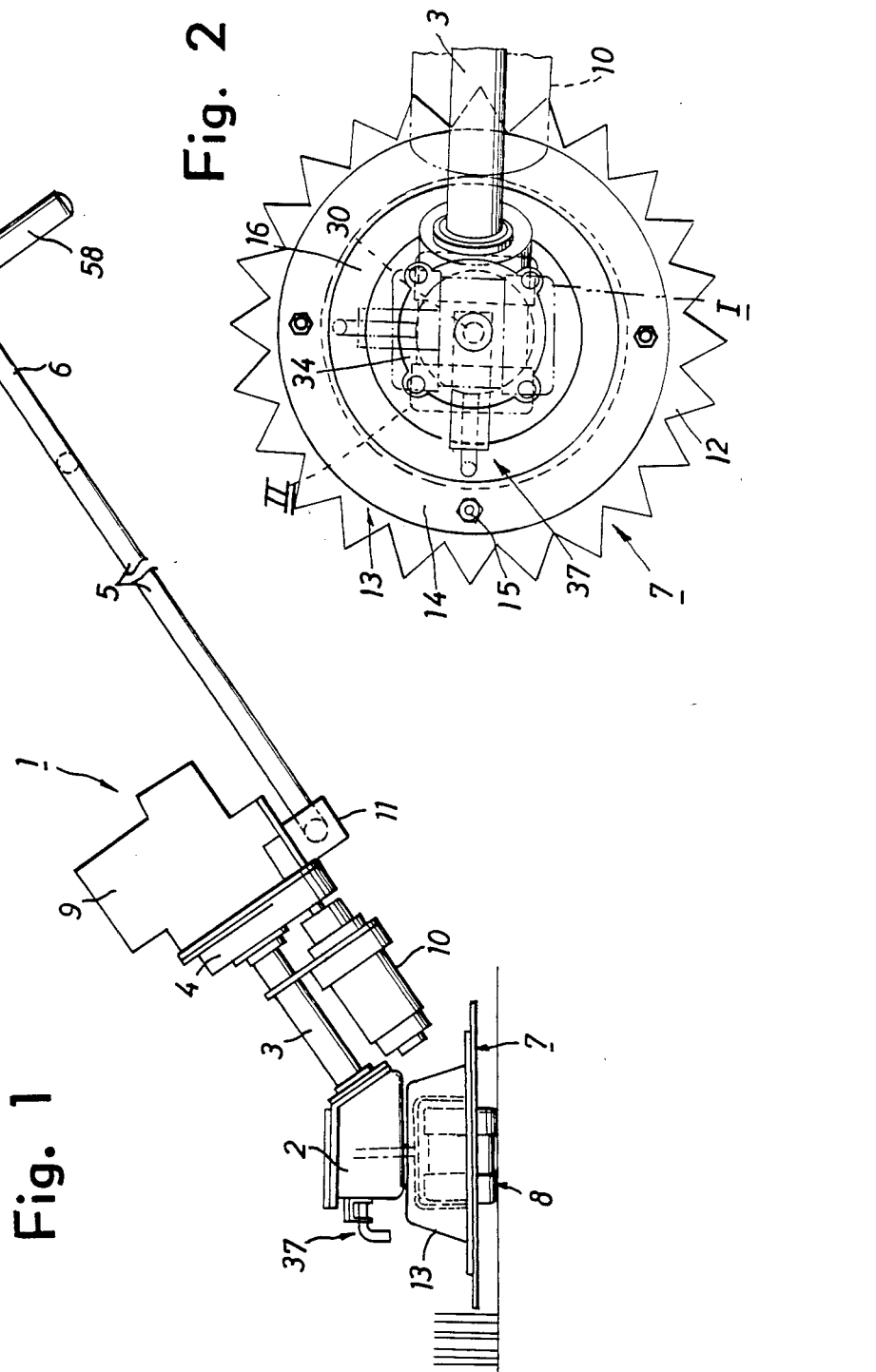

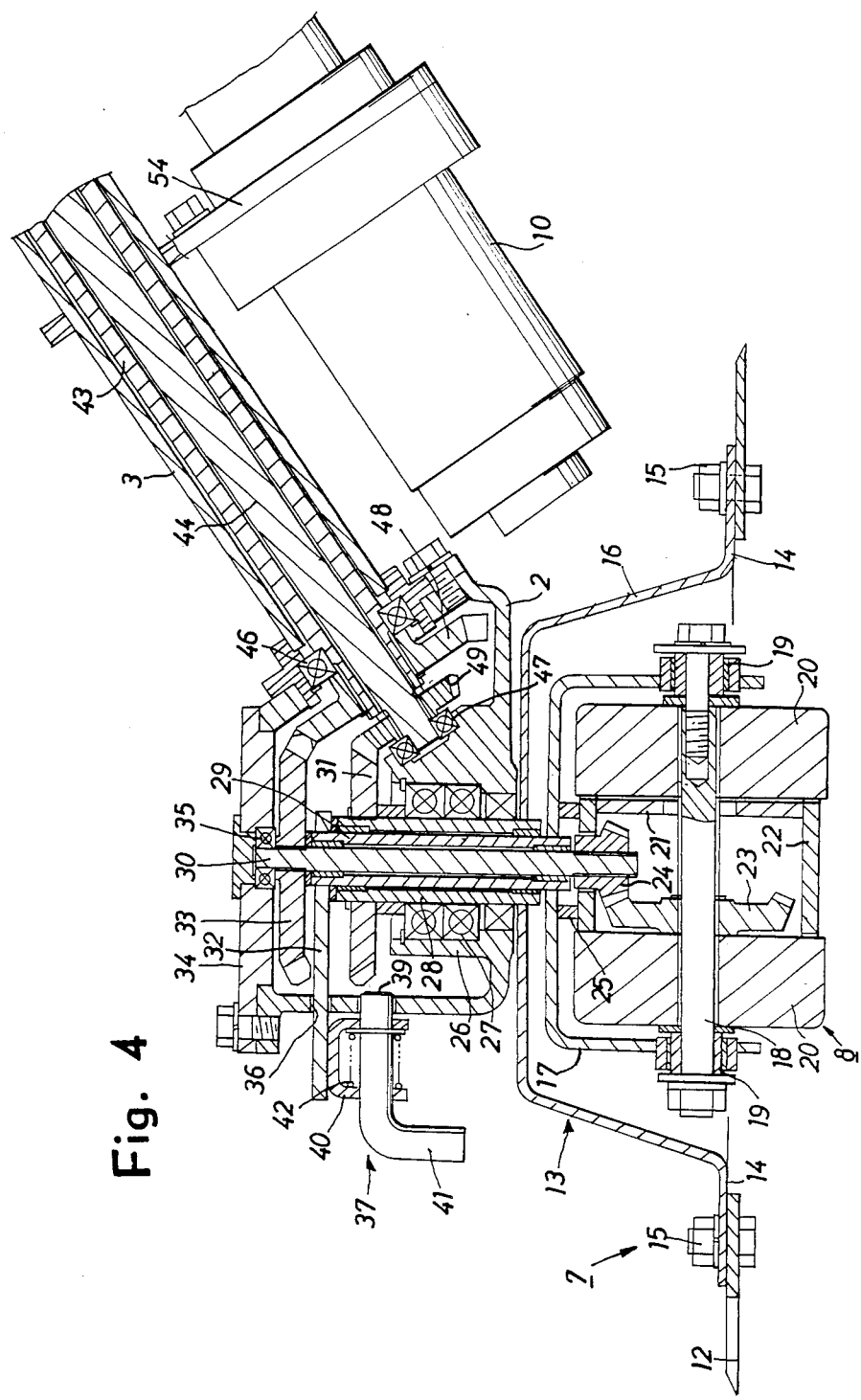

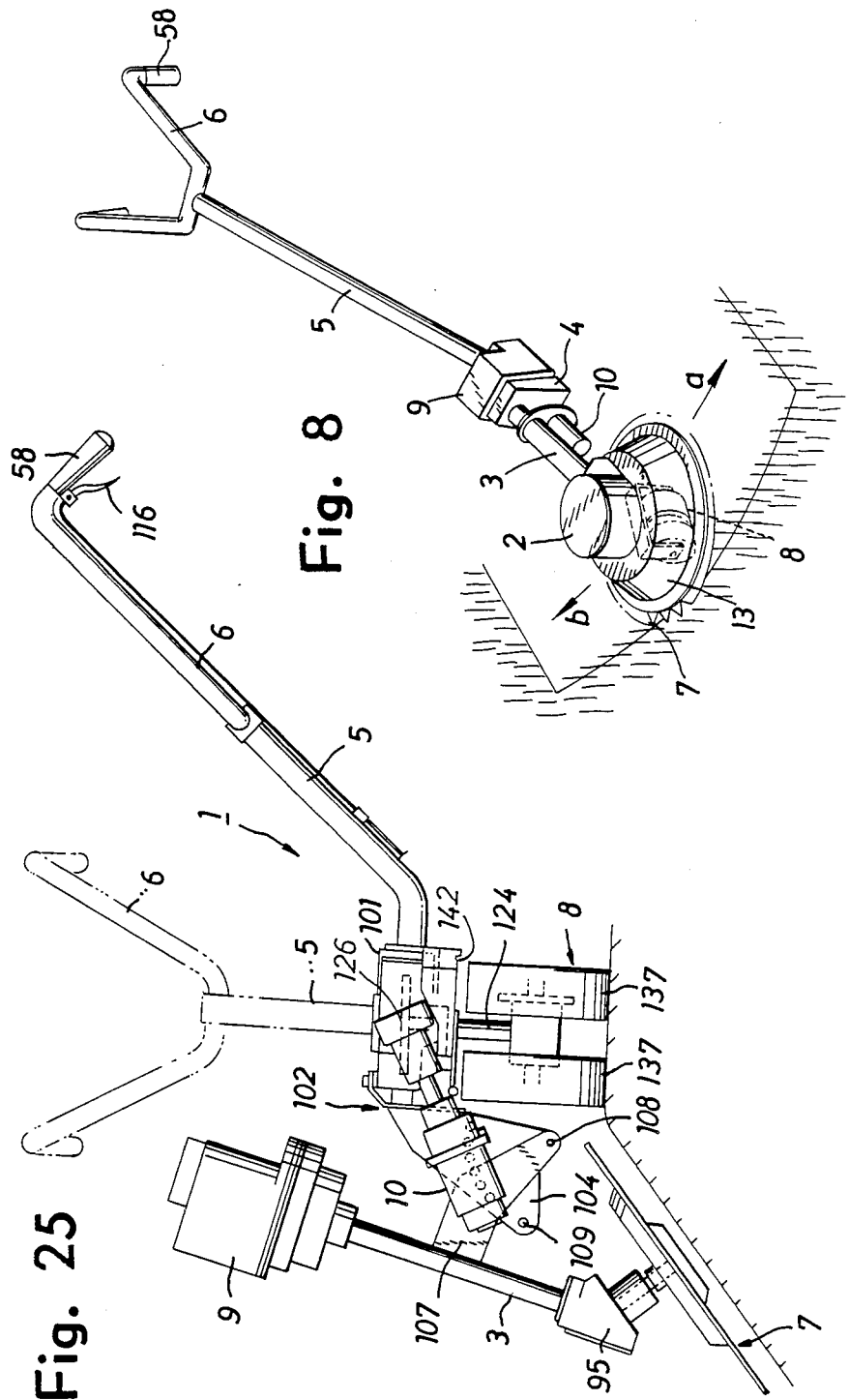

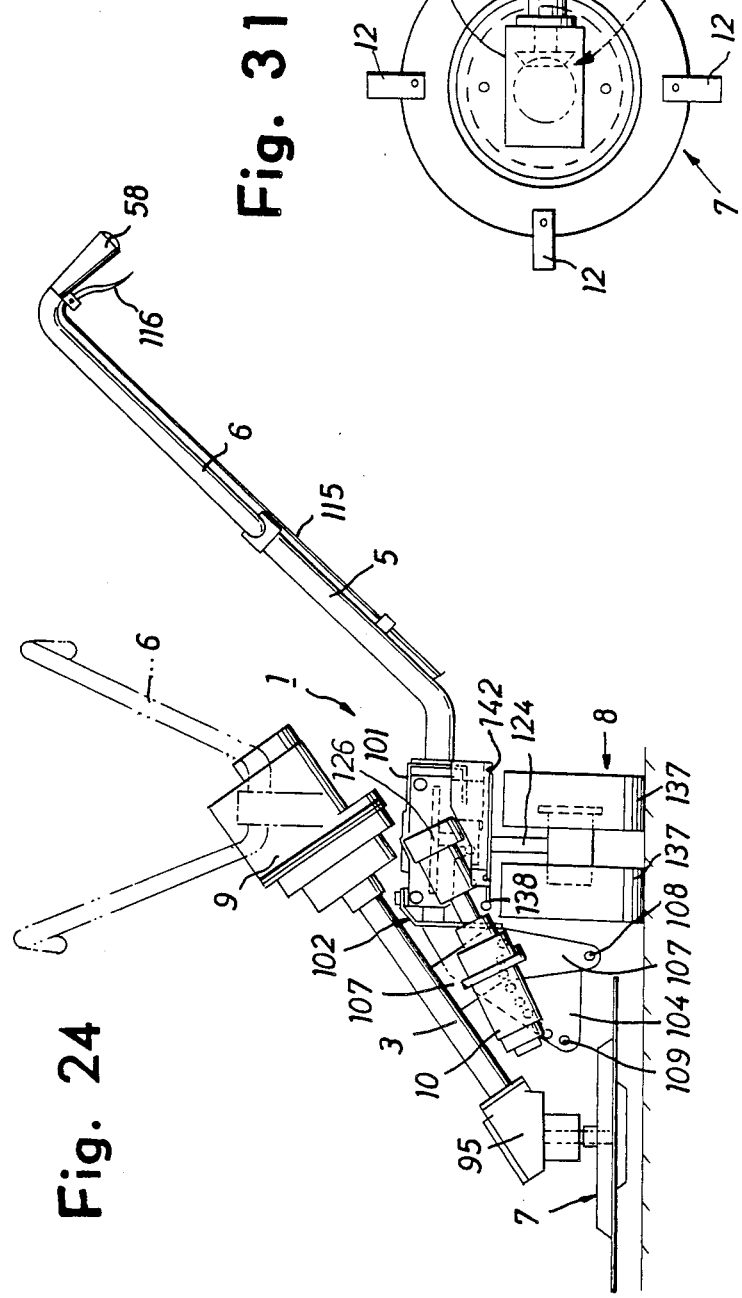

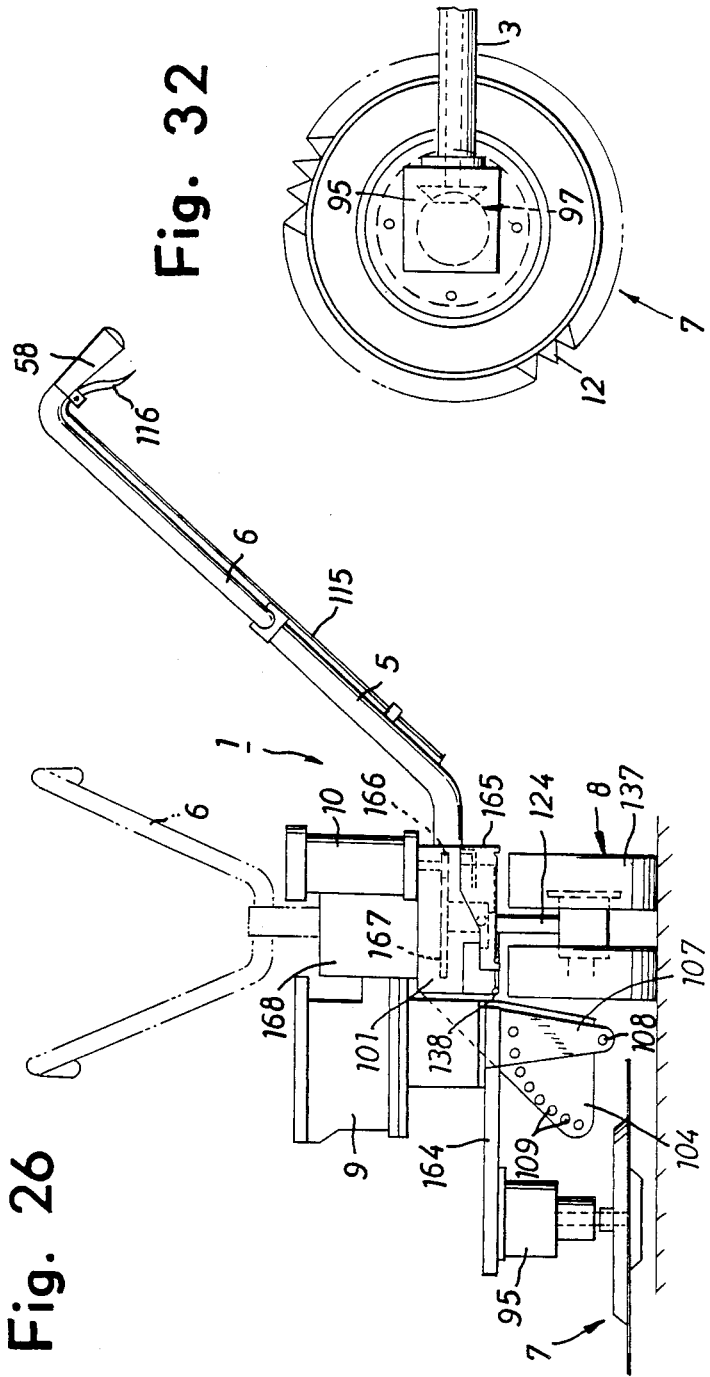

CUTTER-TRIMMER OF WALK-BEHIND TYPE

FIELD OF THE INVENTION AND RELATED ART STATEMENT

The present invention relates to a cuttertrimmer of the walk-behind type.

Mowers of the walk-behind type for use by a person for cutting grass, weeds or the like while walking are disclosed in U.S. Pat. No. 4,267,686 (conventional device 1), U.S. Pat. No. 4,559,768 (conventional device 2), Examined Japanese Utility Model Application No. SHO 48-15238 (conventional device 3), etc.

The conventional device 1 comprises a guide handle provided at the rear of the mower main body, a cutting means provided at the front portion of the body and forcibly movable around a vertical shaft, a swivel wheel determining the level of the cutting means and ground engaging wheels of the nondriven type at the rear of the cutting means.

Although useful, the device is pushed forward by hand since the ground engaging wheels are not driven, so that whereas much labor is not required for mowing on the level ground, the device must be driven with considerable labor on undulating grounds.

Further, although the device is adapted for mowing during its forward travel, extreme difficulties are encountered in deflecting the handle sideways for mowing since the ground engaging wheels have a great tread. If forcibly moved sideway, the device is likely to cause damage to lawns or the like.

The conventional device 2 has cutting means and running wheels which are driven by an engine. This device is adapted to perform a mowing operation easily while running even on undulating areas, but since the device is of the two-axle four-wheel type, the sideways movement of the device is limited, with great difficulties similarly encountered in mowing sideways.

Further because the running wheels are driven by the engine, the transmission between the engine and the wheels must be provided with additional forward-reverse change means to render the wheels reversibly rotatable.

The conventional device 3 comprises cutting means and wheels disposed at the front and rear portions thereof and operatively connected together by belt means, a tubular member carrying the cutter means at it's lower end and an engine mounted on the upper end of the tubular member. Although this device is made more handy than the conventional device 2, the engine at the upper end of the tubular member is likely to upset the balance of the device under gravity. Since the cutter means and the wheels are both driven by the engine, it is difficult to reversibly rotate the wheels as is the case with the device 2.

Moreover, with any of these conventional devices, the cutter means is fixedly positioned relative to the wheels and is not shiftable sideway or upward or downward adjustingly relative to the wheels, so that it is difficult to cut grass while moving the device sideways. The mowing area is therefore small in width. Difficulties are also encountered in efficiently cutting grass or weeds on the slopes of ridges or on shoulders of roads.

OBJECTS AND SUMMARY OF THE INVENTION

A first object of the present invention is to provide a cutter-trimmer of the walk-behind type which comprises cutter means and running wheel means provided in the vicinity of the cutter means and reversibly rotatable about a horizontal axis for supporting the body of the cutter-trimmer and which is thereby adapted to cut grass, weeds or the like while traveling forward, rearward or sideways.

A second object of the invention is to provide a cutter-trimmer of the type described wherein an engine for driving the cutter means and an electric motor for driving the running wheel means are disposed at a longitudinally intermediate portion of the device toward its front end to maintain the device in good balance longitudinally thereof while assuring ease of forward-reverse change of the running wheel means.

A third object of the invention is to provide a cutter-trimmer of the type described which comprises course directing means for selectively shifting the running wheel means to a forward position or to a lateral position about a vertical axis and holding the wheel means in the shifted position to render the course of the wheel means changeable relative to the cutter means and to thereby make the device operable while traveling forward, rearward or sideways.

A fourth object of the invention is to provide a cutter-trimmer of the type described which comprises flex angle adjusting means for angularly adjusting the cutter means upward or downward and fixing the cutter means at the adjusted angle to render the cutter means upwardly or downwardly shiftable relative to the running wheel means and to thereby enable the device to cut grass, weeds or the like easily and accurately on slopes.

A fifth object of the invention is to provide a cutter-trimmer of the type described having a guide handle and handle turning-locking means for turning the guide handle to a rearward position or to a sideways position relative to the body and locking the handle in the turned position, whereby the device is made operable for forward cutting or sideways cutting in a condition suited to the contemplated work.

Still another object of the invention is to provide a cutter-trimmer of the type described wherein the running wheel means is reversibly rotatable by the electric motor in response to an instruction given by remote control from the handle side, and the cutter means is angularly adjustable upward or downward by remote control from the handle side, so as to render the device smoothly guidable and to render the handle deflectable sideways with reduced resistance to guide the device smoothly although the running wheel mean is of the single-axle drive wheel type.

To fulfill the foregoing first and second objects, the present invention provides a cutter-trimmer including cutter means disposed at the front end of the body thereof and drivingly rotatable and a guide handle disposed at the rear end of the body, the cutter-trimmer being characterized in that it comprises:

running means disposed in the vicinity of the cutter means and reversibly rotatable about a horizontal axis for supporting the body thereon, and a cutter means driving engine and a running means driving electric motor provided at a longitudinally intermediate portion of the body toward its front end.

To fulfill the third object, the present invention provides a cutter-trimmer of the type mentioned above which is characterized in that it comprises:

running means disposed in the vicinity of the cutter means and drivingly rotatable about a horizontal axis for supporting the body thereon, drive means provided at a longitudinally intermediate portion of the body toward its front end for driving the cutter means and the running means, and course directing means for selectively shifting the running means to a forward position or to a lateral position about a vertical axis and holding the running means in the shifted position.

To achieve the fourth object, the present invention provides a cutter-trimmer of the type mentioned above which is characterized in that it comprises:

cutter means provided at the front end of the body, running means supporting the body thereon and reversibly rotatable about a horizontal axis, the running means being disposed toward the body front end to the rear of the cutter means at a small distance therefrom, an engine for driving the cutter means, an electric motor for driving the running means, and flex angle adjusting means for angularly adjusting the cutter means upward or downward and fixing the cutter means at the adjusted angle.

To fulfill the fifth object, the present invention provides a cutter-trimmer of the type mentioned above which is characterized in that it comprises:

cutter means provided at the front end of the body, running means supporting the body thereon and reversibly rotatable about a horizontal axis, the running means being disposed toward the body front end to the rear of the cutter means at a small distance therefrom, an engine for driving the cutter means, an electric motor for driving the running means, and handle turning-locking means for turning the guide handle to a rearward position or to a sideway position relative to the body and locking the handle in the turned position.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIGS. 1 to 11 show an embodiment of the present invention;

FIG. 1 is an overall side elevation of a cutter-trimmer;

FIG. 2 is a plan view showing the front portion of the cutter-trimmer;

FIG. 3 is a bottom view of the same;

FIG. 4 is a side elevation in section showing the same;

FIG. 5 is a front view in section showing running means;

FIG. 6 is a side elevation in section showing a second transmission case;

FIG. 7 is a sectional plan view showing a positioning assembly;

FIG. 8 is a perspective view showing the cuttertrimmer in operation;

FIGS. 9 to 11 are diagrams illustrating different modes of operation;

FIG. 19 is an overall side elevation showing the same in forward or rearward travel;

FIG. 20 is a sectional side elevation showing an assembly including cutter means;

FIG. 21 is a plan view showing the same;

FIG. 22 is an elevation partly in development and in section taken along the line A—A in FIG. 21;

FIG. 23 is a plan view in section taken along the line B—B in FIG. 22;

FIG. 24 is an overall side elevation showing the embodiment in sideways travel;

FIG. 25 is an overall side elevation showing the same in condition for cutting grass on a slope;

FIG. 26 is an overall side elevation showing another embodiment;

FIGS. 31 and 32 are plan views showing other two examples of cutter means; and

DESCRIPTION OF THE PREFERRED EMBODIMENTS

Figure 3:
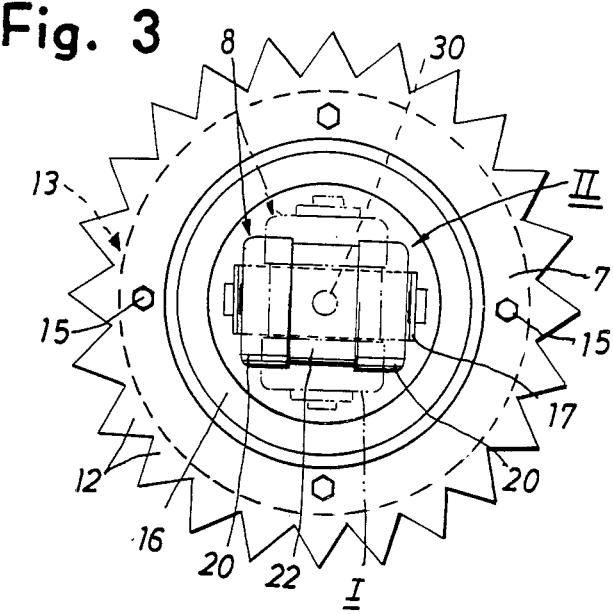

With reference to FIGS. 1 to 3, the body 1 of a cutter-trimmer comprises a first transmission case 2, a connecting tube 3, a second transmission case 4, support rod 5, a handle 6, etc.

Disposed under the first transmission case 2 are cutter means 7 rotatable about a vertical axis, and running means 8 positioned in the vicinity of the cutter means 7. According to the present embodiment, the running means 8 is disposed at the lower side of the central portion of the cutter means 7, supports the body 1 and is reversibly rotatable about a horizontal axis. At one side of the second transmission case 4 opposite to the other side thereof connected to the tube 3, an engine 9 for driving the cutter means 7 is attached to the case 4. The connecting tube 3 has attached thereto a reversibly rotatable electric motor 10 for driving th running means 8.

The first transmission case 2 is positioned at the front end lower portion of the body 1. The case 2 has attached to its rear side the connecting tube 3 extending obliquely rearwardly upward. The second case 4 is attached to the upper end of the tube 3 perpendicular thereto. The support rod 5 is connected to the lower side of the case 4 and extends obliquely rearwardly upward in an inclined position. The rod 5 is connected to the tube 3 by the second case 4 in a stepped fashion. The rod 5 is attached to a bracket 11 on the case 4 and is angularly adjustable upward or downward. The handle 6 is bifurcated and attached to the rear end of the support rod 5.

Thus, the cutter-trimmer body 1 has at its front end the cutter means 7 which is drivingly rotatable and at its rear end, the cutter means 7 has the guide handle 6.

According to the embodiment shown in FIGS. 2 to 4, the cutter means 7 is annular and has a plurality of cutting teeth 12 along its outer periphery. The cutter means 7 is attached to a flange 14 at the lower end of a disk 13 in the form of a truncated cone by bolts 15 arranged circumferentially of the disk.

Figure 5:
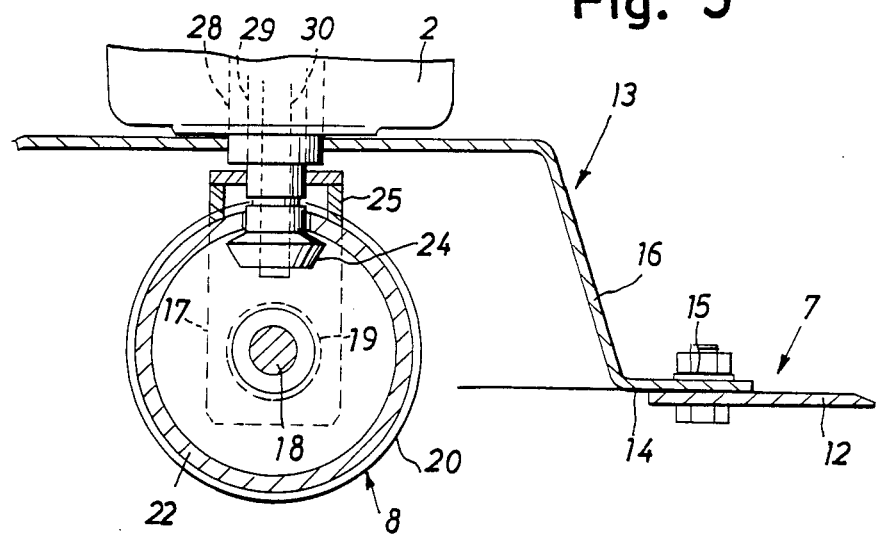

With reference to FIG. 3 to 5, the running means 8 is disposed in the frustoconical portion 16 of the disk 13 and supported by a shaft 18 on an inverted U-shaped bracket 17. The shaft 18 is supported at its opposite ends by bearing portions 19 of the bracket 17 and is rotatable about a horizontal axis. The running means 8 comprises a pair of wheels 20 mounted on the shaft 18 and rotatable therewith. Interposed between the pair of wheels 20 is a hollow cylindrical gear case 22 having a plate 21 at its one end. Housed in the gear case 22 are a bevel gear 23 fixedly mounted on the shaft 18 and a bevel pinion 24 meshing with the gear 23. The gear case 22 is secured to the bracket 17 by a tubular member 25.

As seen in FIG. 4, the first transmission case 2 is internally formed with a bearing holder 26. An outer tubular shaft 28 is supported by a pair of upper and lower bearings 27 on the holder 26 rotatably about a vertical axis. An intermediate tubular shaft 29 is fitted in the outer tubular shaft 28, and an inner shaft 30 is fitted in the intermediate tubular shaft 29, concentrically with the shaft 28, the shafts 28 to 30 being rotatable relative to one another. A bevel gear 31 and the disk 13 are respectively mounted on the upper end and lower end of the shaft 28 and are rotatable therewith. A shift lever 32 and the bracket 17 for the running means 8 are respectively secured to the upper end and lower end of the intermediate tubular shaft 29. A bevel gear 33 and the bevel pinion 24 are respectively mounted on the upper end and lower end of the inner shaft 30 and are rotatable therewith. The upper end of the inner shaft 30 is supported by a bearing 35 on a closure 34 provided at the top of the case 2.

Figure 7:
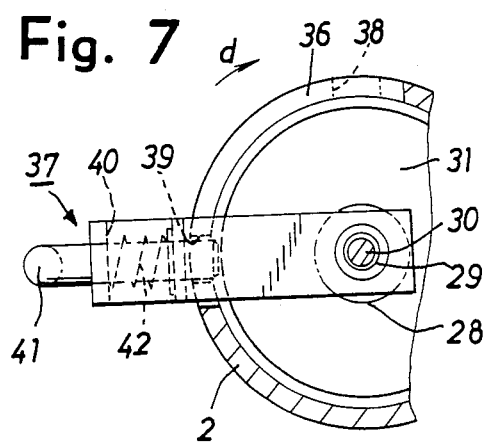

As shown in FIGS. 4 and 7, the shift lever 32 extends outward from the case 2 through a slot 36 formed in the side wall of the case 2 over an angular range of 90 degrees. The running means 8 is shiftable to a forward position I (FIG. 2, phantom line) for forward or rearward travel or to a lateral position II (FIG. 2, dotted line) for a sideways travel by rotating the shift lever 32. The lever 32 can be locked in each of the positions I, II by a positioning assembly 37, which has two pin holes 38, 39 formed in the side wall of the case 2, an L-shaped positioning pin 41 supported by a bracket 40 on the shift lever 32, and a spring 42 for biasing the pin 41 toward the case 2. The positioning pin 41 is selectively engageable in one of the pins holes 38, 39. Thus, course directing means is provided for the running means 8.

Figure 6:
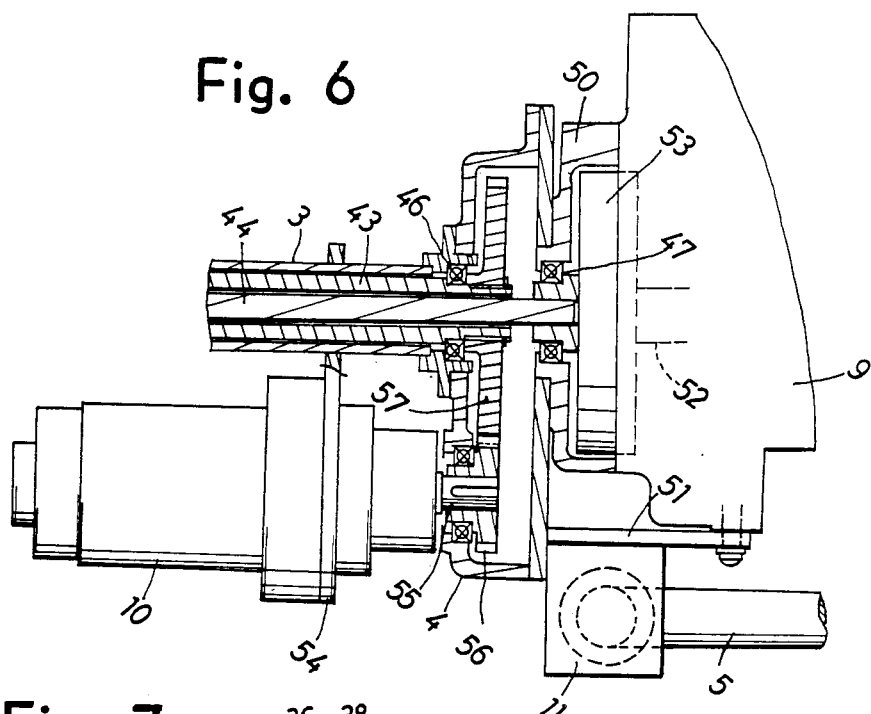

With reference to FIGS. 4 and 6, a tubular shaft 46 and an inner shaft 44 are concentrically inserted through the connecting tube 3. The tubular shaft 43 and the inner shaft 44 are rotatably supported at their opposite ends by bearings 46 and 47, respectively. The tubular shaft 43 has a bevel gear 48 meshing with the bevel gear 33 within the first transmission case 2, while the inner shaft 44 carries a bevel gear 49 meshing with the bevel gear 31 within the case 2.

With reference to FIGS. 1 and 6, the engine 9 is attached to the second transmission case 4 by a housing 50 and a bracket 51 and is positioned on the upper side of the support rod 5. The engine 9 has an output shaft 52 operatively connected to the inner shaft 44 by an electromagnetic clutch 5 within the housing 50. Accordingly, when started up, the engine 9 drivingly rotates the cutter means 7 about the vertical axis through the inner shaft 44, bevel gears 49, 31, outer tubular shaft 28 and disk 13. The clutch 53 can be dispensed with.

The motor 10 is positioned on the lower side of the connecting tube 3 in parallel thereto and is fixed to a bracket plate 54 adjacent to the case 4 and secured to the tube 3. The motor 10 has an output shaft 55 which, as seen in FIG. 6, is operatively connected to the tubular shaft 43 by a small gear 56 and a large gear 57 within the case 4. Accordingly, the running means 8 is drivingly rotatable about the horizontal axis by the motor 10 through the output shaft 55, gears 56, 57, tubular shaft 43, bevel gears 48, 33, inner shaft 30 bevel pinion 24 and bevel gear 23. The motor 10 is reversibly rotatable. The handle 6 has a grip 58 provided with a change switch or start switch for rotating the motor 10 forward or reversely.

Thus, the cutter means driving engine 9 and the running means driving electric motor 10 are arranged at a longitudinally intermediate portion of the body 1 toward its front end and are supported by the running means 8 to lessen the burden on the hands holding the guide handle 6.

The engine 9 is provided with a dynamo for supplying power to the clutch 53 and the motor 10.

The cutter-trimmer of the foregoing construction is used in the following manner for cutting grass, weeds or the like.

FIG. 1 shows the running means 8 as set in the lateral position II. The positioning pin 41 of the positioning assembly 37, i.e. of the course directing means, is engaged in the pin hole 39, locking the intermediate tubular shaft 29 against rotation to hold the running means 8 in the lateral position II.

For working, the running means 8 is placed on the ground, causing the means 8 to support the body 1, and the operator grasping the pair of grips 58 of the handle 6 holds the device from falling sideways. With the cutter means 7 held in rotation by the power from the engine 9, the front portion of the device is reciprocatingly moved rightward and leftward by suitably operating the change switch for the motor 10 to cut grass with the cutter means 7 in rotation. The motor 10, when given a forward instruction by the change switch, forwardly rotates the running means 8 about a horizontal axis in the front-to-rear direction through the output shaft 55, gears 56, 57, tubular shaft 43, bevel gears 48, 33, inner shaft 30, bevel pinion 24, bevel gear 23 and shaft 18, thereby moving the front portion of the device in the direction of arrow a in FIG. 8 and permitting the rotating cutter means 7 to cut weeds or the like. Upon the device traveling leftward to a desired position, a reverse instruction is given to the motor 10 by the change switch, whereupon the motor 10 is brought into reverse rotation reversely rotating the running means 8 through the above transmission system. Consequently, the front portion of the device moves in the direction of arrow b in FIG. 8 to cut weeds or the like by the rotation of the cutter means 7.

Figure 9:
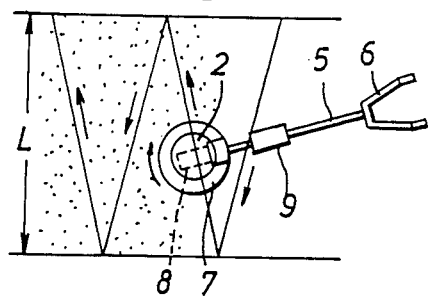

While the shaft 18 is oriented in the frontrear direction in the above operation, the operator slightly deflects the handle 6 sideways with forward-to-reverse and reverse-to-forward changes in the direction of the running means 8, whereby the running means 8 can be made to advance in oblique directions while traveling sideways, with the result that the device advances with zigzag movement to cut grass over an area of a width L as seen in FIG. 9.

Figure 10:
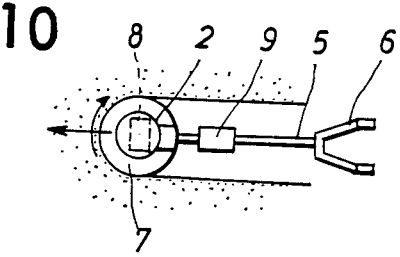

To cut grass while moving the cutter-trimmer forward or rearward, the running means 8 is shifted to the forward position I. With reference to FIG. 4 showing the running means 8 in the lateral position II, the positioning pin 41 is first removed from the pin hole 39 to unlock the shift lever 52, which is then turned through about 90 degrees in the direction of arrow d in FIG. 7. This movement of the lever causes the intermediate shaft 29 to rotate the running means 8 from the lateral position II to the forward position I indicated in the phantom line in FIG. 2, whereupon the positioning pin 41 is engaged in the pin hole 38 to lock the shift lever 52 again against rotation. With the shaft 18 positioned laterally, the running means 8 is driven forward to advance the cutter-trimmer forward, whereby grass, weeds or the like on the front side of the cutter means 7 can be thereby cut as shown in FIG. 10.

Figure 11:
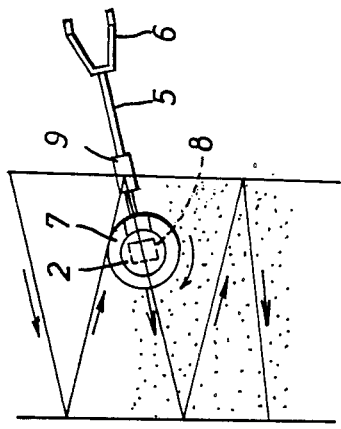

If the handle 6 is slightly deflected sideways with the running means 8 in the forward position while driving the motor 10 forward and reversely, the device can be advanced or retracted while being moved rightward and leftward with zigzag movement as illustrated in FIG. 11.

Figure 13:
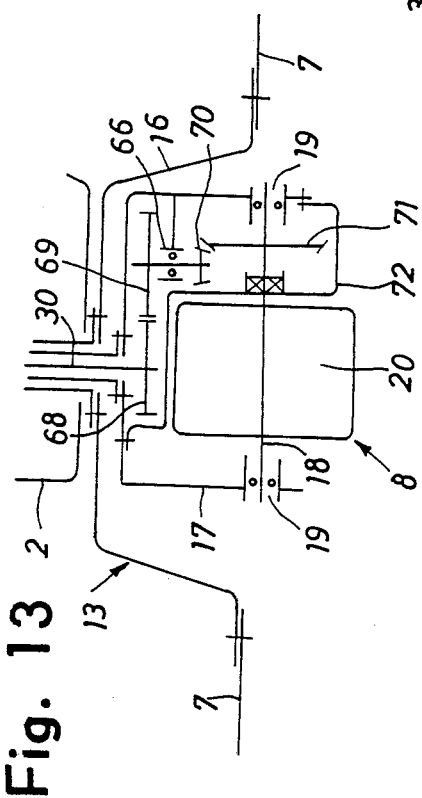
FIG. 13 is a diagram showing another example of the same.
Figure 12:
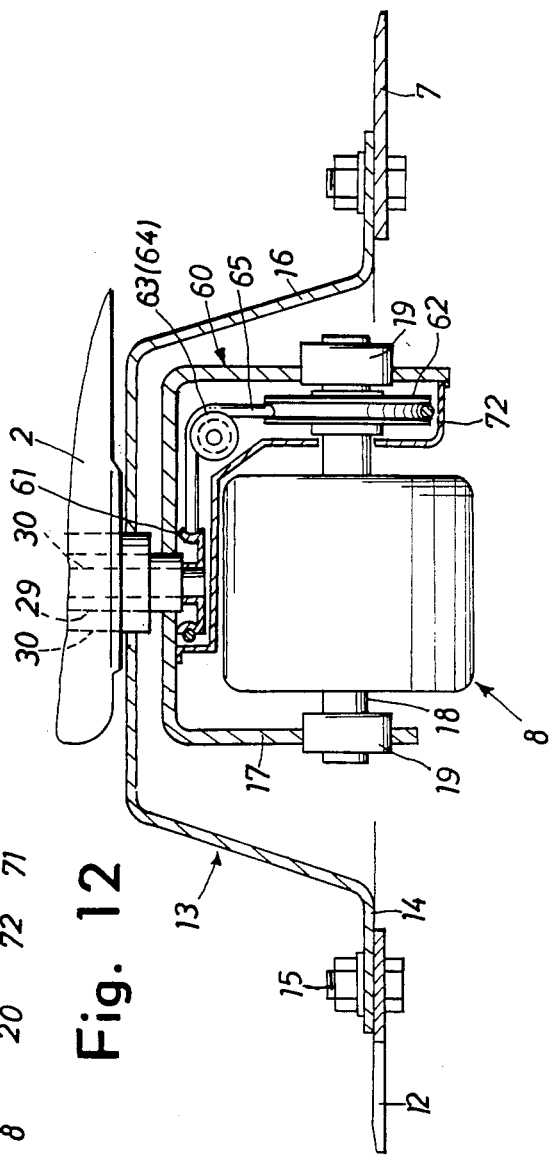
FIG. 12 is a sectional side elevation showing another example of running means transmission system.

FIGS. 12 and 13 each show running means 8 including a single wheel 20, and a transmission 60 provided at one end of a shaft 18 supporting the wheel 20 thereon for transmitting power from the inner shaft 30 to the shaft 18. The transmission of FIG. 12 comprises pulleys 61, 62 mounted on the lower end of the inner shaft 30 and the shaft 18, respectively, two intermediate pulleys 63, 64 on the bracket 17 and an endless belt 65 passed over the pulleys 63, 64 and reeved around the pulleys 61, 62.

The transmission 60 of FIG. 13 comprises a intermediate shaft 67 supported by a bearing case 66 on the bracket 17, gears 68, 69 for coupling the inner shaft 30 to the intermediate shaft 67, and bevel pinion 70 and bevel gear 17 for coupling the shaft 67 to the shaft 18. The transmission 60 is covered with a cover 72 attached to the bracket 17.

Throughout FIGS. 4, 12 and 13, like parts are designated by like reference numerals.

Although the cutter-trimmer body 1 of the foregoing embodiment has a stepped configuration and has the engine 9 and the motor 10 attached thereto, the body 1 may comprise the first transmission case 2 and the single support rod 5 which is made to extend from the case 2 obliquely rearwardly upward, with the engine 9 and motor 10 mounted on the case 2. Alternatively, the engine 9 and the motor 10 may be attached to the rod 5 by bracket plates.

The cutter means 7 may comprise a plurality of divided members arranged circumferentially of the disk 13 and shiftably attached to the upper or lower sides of the flange 14 for the adjustment of the cutting level.

The cutter means 7 may be in the form of a strip and secured at its central portion to the tubular shaft 28.

Figure 15:
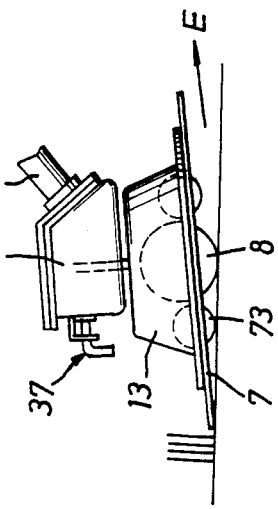
FIG. 15 is a side elevation showing the cutter means equipped with the stabilizing ground engaging members during a cutting operation.
Figure 14:
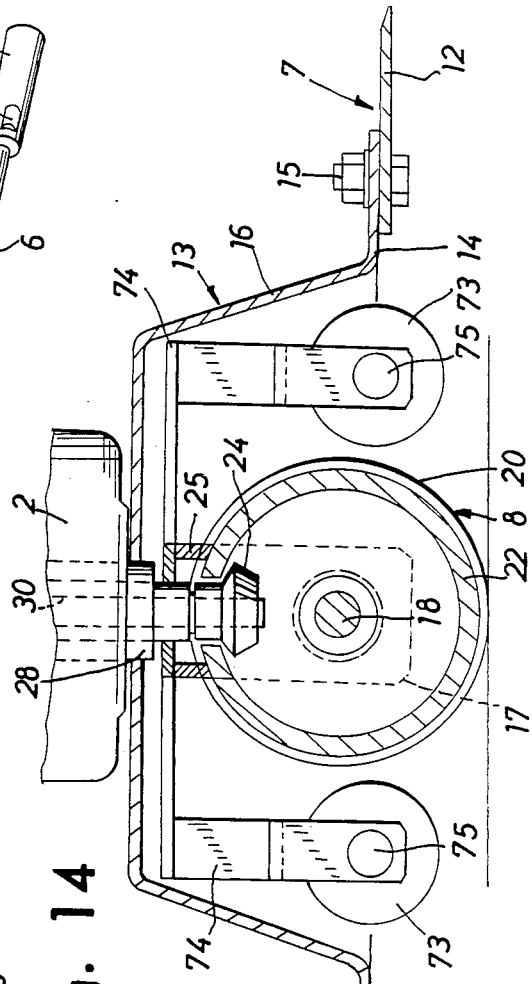
FIG. 14 is a sectional side elevation showing the running means equipped with stabilizing ground engaging members.

FIGS. 14 and 15 show stabilizing ground engaging members 73 disposed in the vicinity of the running means 8 for preventing the cutting teeth 12 from scalping the ground.

With reference to FIG. 14, an inverted U-shaped bracket 74 crossing the bracket 17 when seen from above is attached thereto and carries shafts 75 rotatably. The stabilizing member 73, which is in the form of a wheel, is rotatably mounted on each shaft 75.

When the device is downwardly inclined toward the direction of advance of the cutter means 7 as seen in FIG. 15, one of the ground engaging members 73 and the running means 8 both come into contact with the ground, preventing the cutter means 7 from scalping the ground while assuring smooth discharge of the clippings in the direction of arrow E. This precludes damage to the cutting teeth, which in turn are prevented from cutting the roots of grass.

Insofar as the stabilizing ground engaging member 73 has the above function, only one member 73 may be disposed on one side of the running means 8 in the vicinity thereof or at a position outside the upwardly recessed portion (frustoconical portion 16). The member 73 need not always be in the form of a wheel but can be a shoe slidable on the ground.

Figure 16:
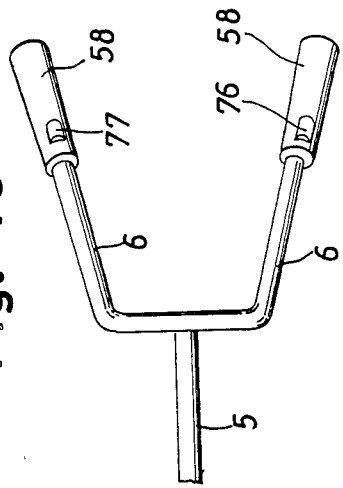
FIG. 16 is a plan view showing a guide handle.
Figure 17:
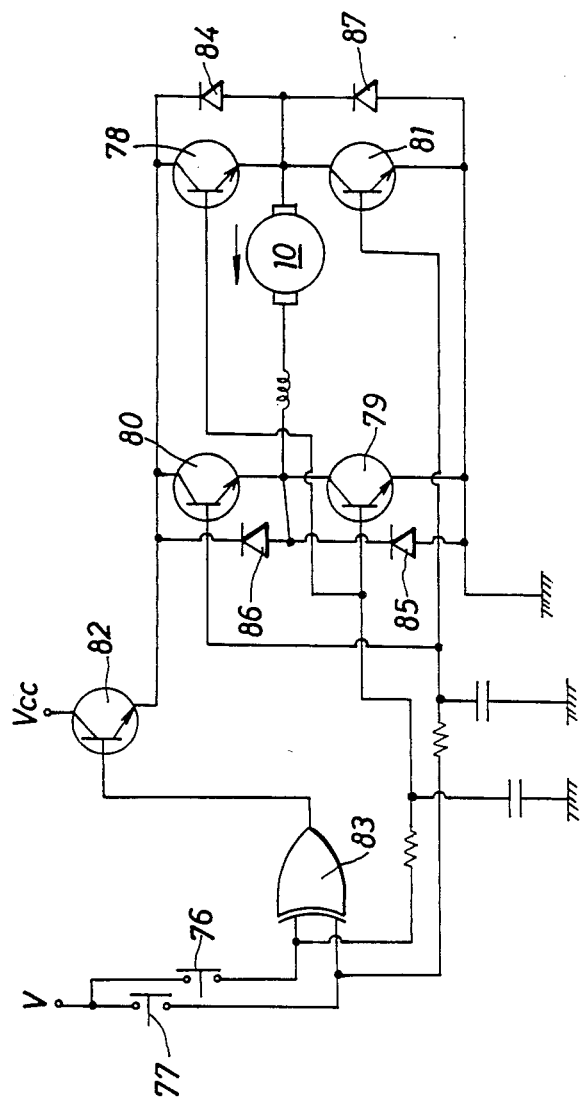
FIGS. 17 and 18 are diagrams showing motor control circuits.

FIG. 16 shows forward-reverse switching means for the motor 10, and FIG. 17 shows a control circuit for the motor 10.

With reference to FIG. 16, the pair of grips 58 of the handle 6 are provided with a forward switch 76 and a reverse switch 77, respectively, for giving forward and reverse instructions for controlling the motor 10. These switches 76, 77 are, for example, of the push button type.

With reference to the motor control circuit of FIG. 17, the motor 10 has connected thereto forward-rotation transistors 78, 79 and reverse-rotation transistors 80, 81 for changing the direction of current through the motor 10. The forward transistors 78, 79 conduct in response to the forward instruction from the forward switch 76, and the reverse transistors 80, 81 conduct in response to the reverse instruction from the reverse switch 77. Indicated at 82 is a power supply transistor, which is driven by an exclusive OR circuit 83. The OR circuit 83 functions to bring the transistor 82 into conduction only when one of the forward and reverse switches 76, 77 is turned on. Protective diodes 84 to 87 are connected in parallel with the transistors 78 to 81, respectively.

When the forward switch 76 on the grip 58 is depressed to give a forward instruction to the motor 10, the transistor 82 conducts through the OR circuit 83, and the forward transistors 78, 79 conduct, passing current through the motor 10 in the direction of arrow in FIG. 17 to drive the motor 10 forward.

When a reverse instruction is given to the motor 10 by depressing the reverse switch 77 on the right grip 58, the motor 10 is alternatively driven reversely, driving the running means 8 reversely through the foregoing transmission system.

To perform a cutting operation while moving the device zigzag, the forward and reverse switches 76, 77 are turned on alternately, whereas when the two switches are depressed at the same time, the transistor 82 is brought out of conduction, holding the motor 10 at rest.

While the embodiment has the separate forward and reverse switches 76, 77, the forward-reverse switching means may be in the form of a single change switch.

Figure 18:
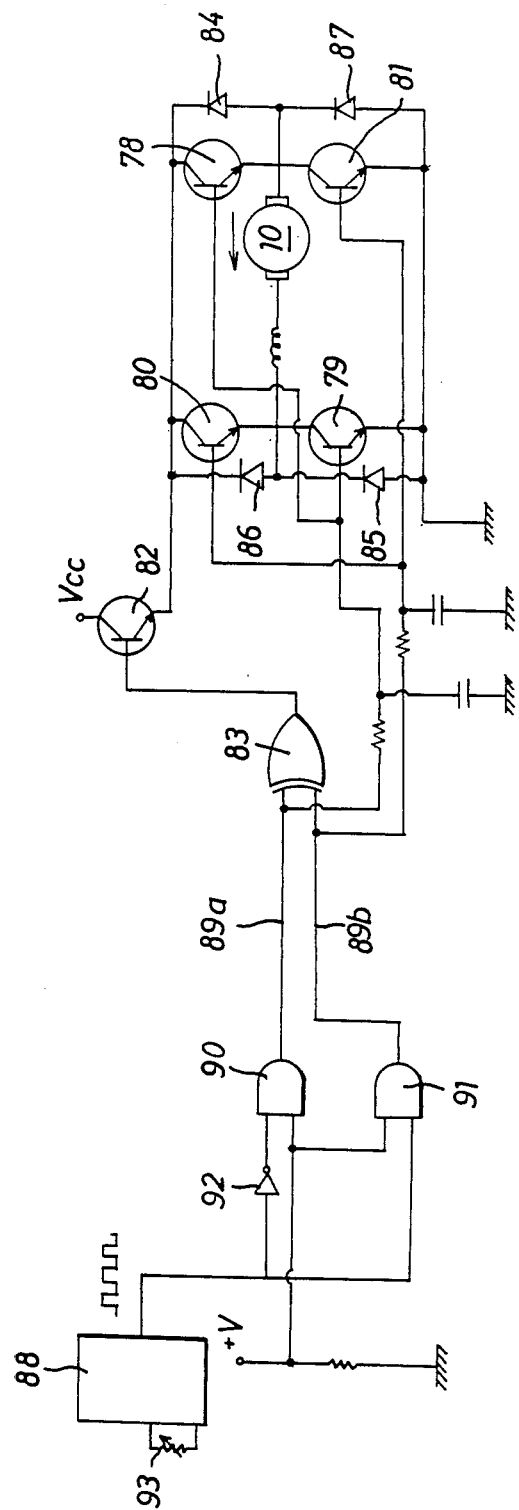

With reference to FIG. 18, the motor control circuit of FIG. 17 is provided with a signal generator 88 for giving forward and reverse instructions 89a, 89b alternately with a predetermined period to rotate the motor 10 forward and reversely.

With reference to FIG. 18, the motor 10 has connected thereto forward-rotation transistors 78, 79 and reverse-rotation transistors 80, 81 for changing the direction of current for the forward or reverse rotation of the motor. The forward transistors 78, 79 conduct in response to the forward instruction 89a from an AND circuit 90, and the reverse transistors 80, 81 conduct in response to the reverse instruction 89b from an AND circuit 91. A power supply transistor 82 is driven by an exclusive OR circuit 83. The circuit 83 functions to bring the transistor 82 into conduction only when one of the AND circuits 90, 91 is turned on.

Applied to the input side of the AND circuits 90, 91 are a +V power supply and, via a NOT circuit 92 or directly, the output of the signal generator 88. The signal generator comprises circuits for producing rectangular wave signals alternately with the predetermined period. One of the signals is used for forward rotation, and the other for reverse rotation. The signal generator 88 has a variable resistor 93 for adjusting the period of signal emission. The duration of forward or reverse rotation is adjustable by the resistor 93 a desired. For example, the resistor 93 is provided in one of the grips 58 concentrically therewith.

Thus, the reversible motor 10 for driving the running means 8 forward and reversely is rotated forward and reversely in response to forward and reverse instructions 89a, 89b which are produced alternately with a predetermined period by the signal generator 88 included in the control circuit of FIG. 18. Consequently, the motor 10 is so driven with the predetermined period, permitting the present device to automatically cut grass during reciprocating travel.

With reference to FIGS. 19 to 23, a second embodiment of the invention will be described.

Figure 19:
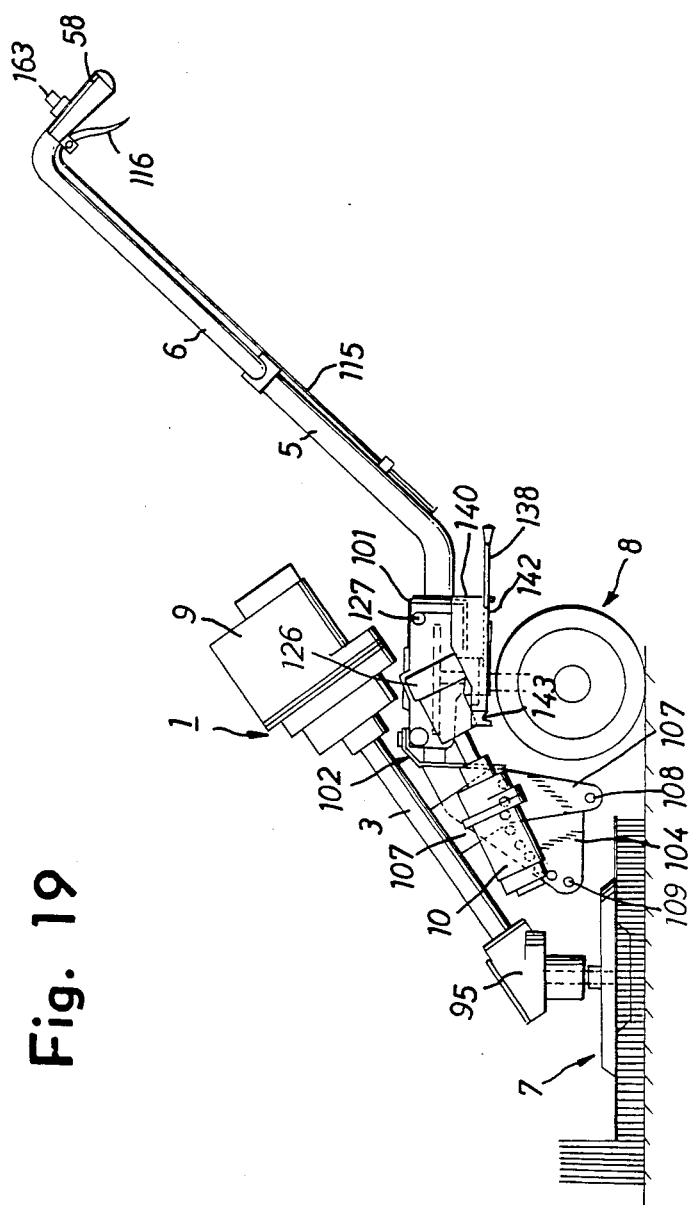
FIGS. 19 to 23 show a second embodiment of the present invention.

FIG. 19 shows a cutter-trimmer having cutter means 7 at the front end of the body thereof, and running means 8 to the rear of the cutter means 7 in proximity thereto. The cutter means 7 is driven by an engine 9, and the running means 8 by an electric motor 10.

The cutter means 7 has a cutter shaft 94 which is supported by bearings 96 on a transmission case 95 rotatably about a vertical axis. A bevel gear assembly 97 is housed in the case 95 as seen in FIG. 20.

A connecting tube 3 extends rearwardly upward from the case 95 and has the engine 9 mounted on its upper end. The engine 9 is positioned above the running means 8.

Figure 20:
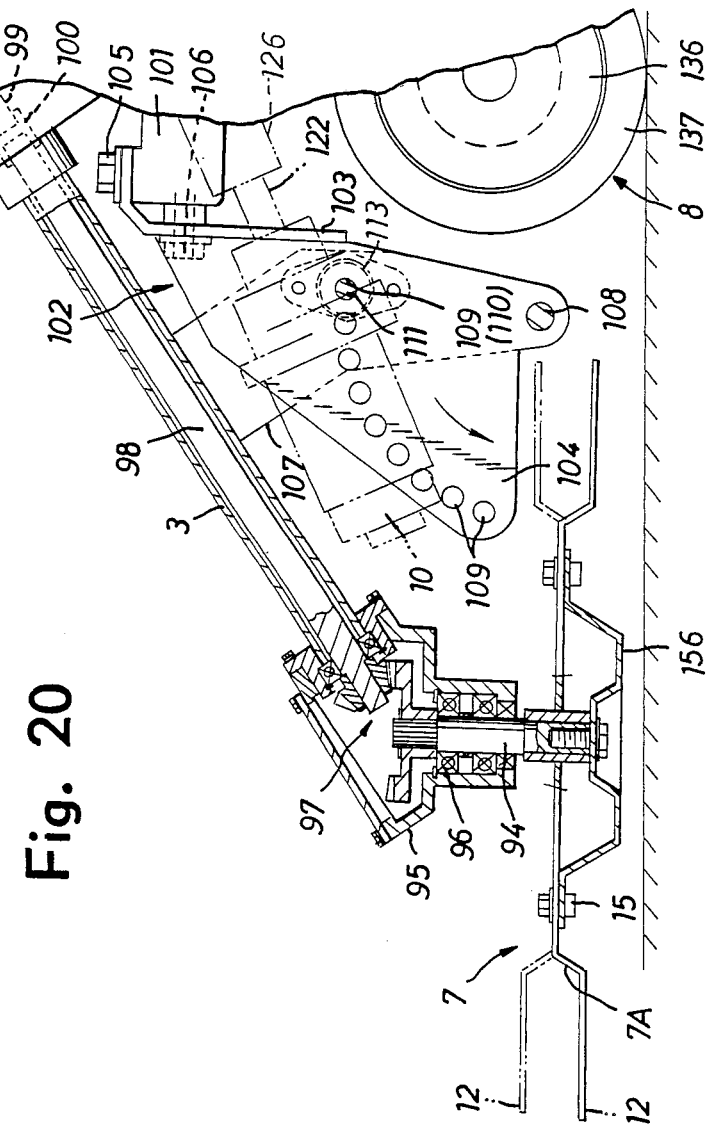

As shown in FIG. 20, a transmission shaft 98 for the cutter means is inserted through the tube 3. The shaft 98 has one end connected to the output shaft 99 of the engine by a coupling 100 and the other end connected to the bevel gear assembly 97. Thus, the engine 9 rotates the cutter shaft 94 about its axis through the transmission shaft 98 and the bevel gear assembly 97, causing the teeth 12 of the cutter means 7 to cut grass, weeds or the like.

The cutter means 7 is in the form of a disk as seen in FIG. 20. The tooth portion 12 extends via a stepped portion and is invertably attached to the base portion of the means 7 with bolts 15. Thus, the cutting level is variable by inverting the tooth portion 12.

Under the engine 9, a transmission case 101 for the running means 8 is disposed above the means 8. The transmission case 101 is attached to the tube 3 by a support frame 102, etc. Guide means including a support rod 5 and a handle 6 extends obliquely rearwardly upward from the case 101.

Figure 21:
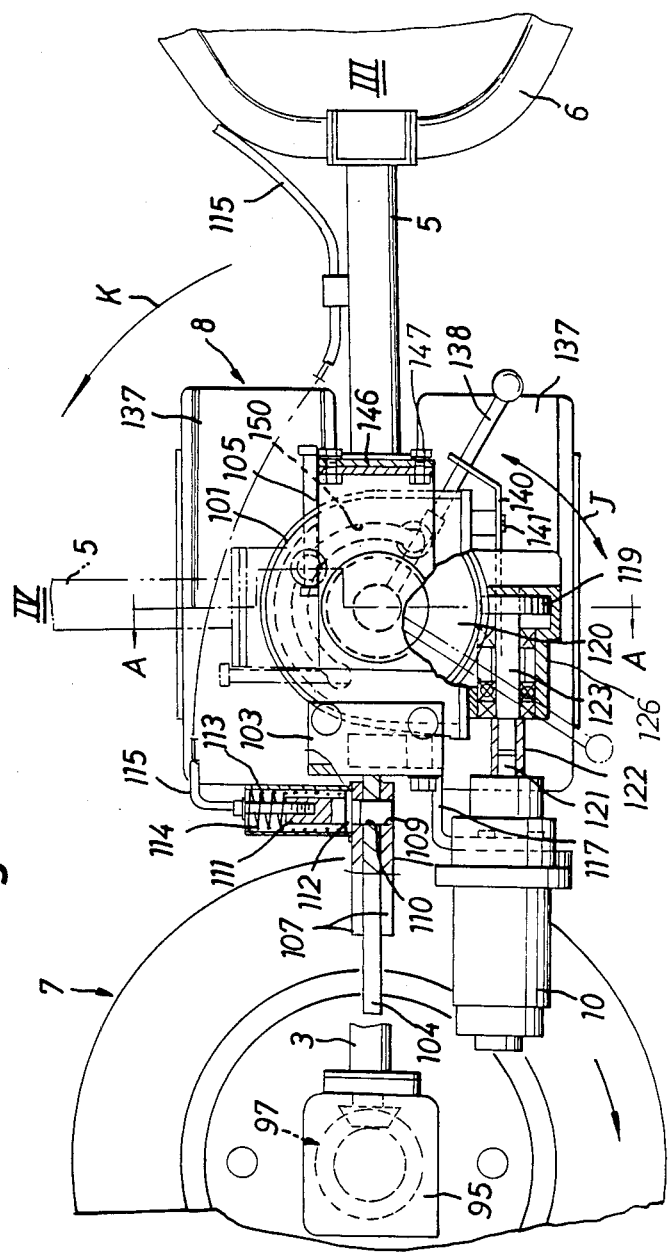

With reference to FIG. 20, the support frame 102 comprises a base plate 103 which is an inverted L-shaped when seen from one side, and a flat bracket plate 104 projecting from the base plate 103 and generally in the form of a sector when seen from one side. As shown in FIGS. 20 and 21, the upper portion of the base plate 103 is fastened to the front end top portion of the transmission case 101. The upright portion of the plate 103 is fastened with bolts 106 to the front wall of the case 101 as opposed thereto, with the bracket plate 104 projecting forward from the base plate 103 under the tube 3.

A pair of connecting arms 107 extending downward from the connecting tube 3 are fitted over the opposite sides of the bracket plate 104. The superposed lower ends of the arms 107 and plate 104 are rotatably supported by a pivot 108, whereby the cutter means 7 is flexibly connected to the running means 8 upwardly or downwardly movably about the pivot 108 as indicated by an arrow in FIG. 20.

The bracket plate 104 has adjusting holes 109 arranged at a spacing on a circular-arc line centered about the pivot 108. Lock holes 110 coinciding with the holes 109 are formed in the connecting arms 107. One of the arms 10 which is at a larger distance from the motor 10 is provided with a lock pin 111 removably insertable through the lock holes 110 and adjusting hole 109 which are in register to provide flex angle adjusting means.

As shown in FIG. 21, the lock pin 111 is slidably inserted in a guide tube 113 integral with a guide flange 112 and secured to the arm 107. The guide tube 113 has accommodated therein a coiled spring 114 for biasing the lock pin 111 into the registered holes.

The lock pin 111 is connected to a lever 116 on the handle grip 58 by Bowden cable comprising an inner wire and an outer wire so as to be removable from the holes for unlocking by remote control, i.e. by grasping the lever, against the coiled spring 114 as seen in FIG. 19.

The electric motor 10, which is driven by a dynamo on the engine 9, is interposed between the cutter means 7 and the running means 8, is disposed at one side of the connecting tube 3 therebelow and is attached to the frame 102 by a stay 117 as seen in FIG. 21. The motor is inclined forwardly downward as shown in FIG. 20.

Figure 22:
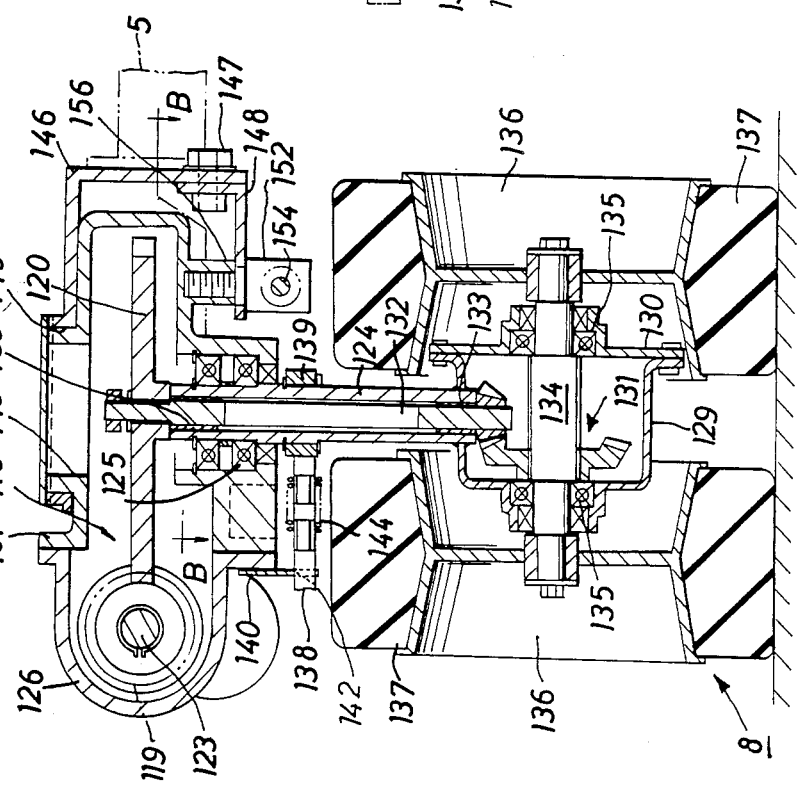

The transmission case 101 houses a first transmission 118 for the motor 10 to drive the running means 8. With reference to FIGS. 21 and 22, the transmission 118 comprises a worm 119 and a worm wheel 120 in mesh therewith. As shown in FIG. 21, the worm 119 has its shaft 123 connected to the output shaft 121 of the motor 10 by a coupling 122 and is thereby made rotatable with the motor 10.

As shown in FIG. 22, the worm wheel 120 is reversibly rotatable about a vertical axis by meshing engagement with the worm 119 and is supported by a connecting tubular shaft 124 and bearings 125 on a lower boss of the case 101.

The transmission case 101 has an open side, which is closed with a worm case 126 fastened to the case 101 by bolts 127 shown in FIG. 19. The worm shaft 123 is supported by bearings 128 on a bulging portion of the case 126.

As seen in FIG. 22, a bowl-shaped case 129 is attached to the lower end of the connecting tubular shaft 124 and is closed with a closure 130. A bevel gear mechanism 131 for the running means 8 is housed in the case 129 and operatively connected to the worm wheel 120 by a transmission shaft 132.

The transmission shaft 132 is inserted through the tubular shaft 114 and supported by a sleeve bearing 133 rotatably about its own axis.

The bevel gear mechanism 131 includes an axle 134 carrying a reduction gear and supported at its opposite ends by bearings 135 on the gear case 129, 130 rotatably about a horizontal axis.

A wheel disk 136 is fixedly mounted on each end of the axle 134 and has fixedly fitted around its rim a wheel body 137 of rubber, plastic or the like. Thus, the running means 8 is of the one-axle two-wheel type.

The running means 8 is rotatable about a vertical axis relative to the transmission case 101 through an angle of 90 degrees. Consequently, the running means 8 is shiftable to a forward position (FIG. 19) for forward or rearward travel or to a lateral position (FIG. 24) for sideways travel, relative to the cutter means 7 disposed at the front end of the cutter-trimmer body 1.

The means for thus shifting the running means 8, i.e. course directing means therefor, has the construction shown in FIGS. 21 and 22. A positioning lever 138 has a sleeve boss 139 which is fittingly attached to the connecting tubular shaft 124 at a position under the transmission case 101. A positioning plate 140, bolted as at 141 to the side wall of the worm case 126, is formed in its lower edge with positioning recesses 142 and 143 at rear and front portions thereof respectively. The lever 138 is engageable in these recesses.

The lever 138 has an intermediate flexible portion 144 made of a coiled spring as seen in FIG. 22. The lever 138 is releasable from the recess 142 or 143 when moved down as flexed at the portion 144. When the lever is turned through an angle of 90 degrees in either direction of arrows J in FIG. 21 and then engaged in the recess, the running means can be shifted to and locked in the corresponding one of the forward position (FIG. 19) and the lateral position (FIG. 24).

The positioning lever 138 is thus turned as released from the recess, by moving the guide handle 6 and moving the lever 138 in the direction of arrow J relative to the case 101.

Further according to the second embodiment, the guide handle 6 is turnable relative to the cutter means 7 and lockable in the turned position. More specifically, the handle 6 is movable from position III to position IV shown in FIG. 21 through 90 degrees in the direction of arrow K and is lockable in the position III or IV.

In the position III the handle 6 is in alignment with the cutter means 7 in front thereof. In the position IV, the cutter means 7 is laterally projecting at one side of the handle 6.

Figure 23:
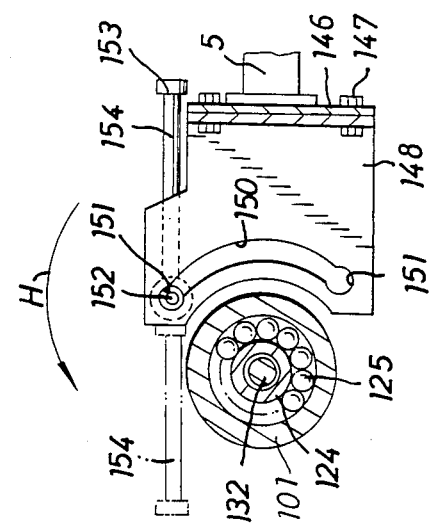

With reference to FIGS. 22 and 23, the handle turning means comprises a handle holder 146 which is L-shaped in section and having a fitting opening 145, and a guide plate 148 bolted to the upright wall of the holder 146 as at 147 and L-shaped in section. The transmission case 101 has at its top a projection 149 centered about a vertical axis and fitting in the opening 145. The guide plate 148 is opposed to a portion of the bottom side of the case 101. The holder is rotatable around the projection.

The guide plate 148 is formed with a circular-arc slot 150 centered about the vertical axis. The slot 150 is enlarged at its opposite ends to provide positioning portions 151. A lock bolt 152 is inserted through one of these portions 151.

A turning lever 154 having a flange 153 at each end is slidably inserted through the head of the lock bolt 152 perpendicular thereto. The threaded portion of the lock bolt 152 can be tightly or loosely screwed into an internally threaded portion of either of two bosses 156 formed on the bottom side of the first transmission case 101.

The handle 6 can be shifted from the position III to the position IV by turning the lever 154 in the direction of arrow H shown in FIG. 23, sliding the lever 154 from phantom-line position to solid-line position, turning the lever 154 again in the direction of arrow H to loosen the threaded portion of the lock bolt 152 from the internally threaded portion 155 and thereby release the guide plate 148 from the pressure of the bolt 152 and then turning the handle 6 in the direction of arrow K in FIG. 21, with the lock bolt 152 guided through the slot 150 and the guide plate 148 turned around the projection 149 at the opening 145. Consequently, the handle 6 can be rotated through 90 degrees from position III to position IV. The lock bolt 152 is thereafter screwed up into the threaded portion 155.

The support rod 5 of the handle 6 is attached to the handle holder 146.

With reference to FIG. 20, the cutter means 7 is removably fastened to a bowl-shaped skid 170 with bolts 15. The cutter means 7 has a toothed portion 12.

As seen in FIG. 20, the cutter means 7 has a stepped portion 7A. The cutter means 7 can be attached upside down to the skid 170 by the bolts 15. Thus, the cutting level is adjustable to the solid-line level or phantom-line level shown in FIG. 20.

The cutter means 7 may comprise revolvable cutting blades 12 as seen in FIG. 31 or a saw-toothed portion 12 as shown in FIG. 32. Although not shown, the cutter means may further comprise string-like blades or a reciprocating cutter unit.

Figure 33:
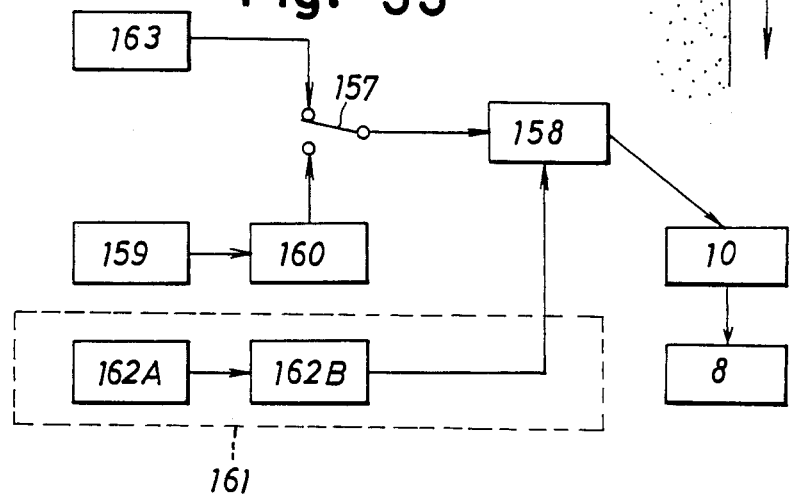
FIG. 33 a diagram showing a motor control circuit for the second embodiment.

FIG. 33 shows a control circuit for the motor. Indicated at 157 in FIG. 33 is an automatic/manual change switch, at 158 a motor drive circuit, at 159 a time setting variable resistor, at 160 a timer circuit, at 161 a speed change unit comprising a speed setting variable resistor 162A and a speed change circuit 162B, and at 163 a manual switch mounted on the grip 58 of the handle 6.

While the motor 10 is driven by the power from the dynamo of the engine 9, the direction of rotation thereof is changed in response to a pulse signal at a specified time interval for a forward-reverse travel or rightward-leftward travel.

Thus, with use of the circuit, the motor 10 is automatically or manually controllable to neatly cut grass over an area of specified width.

While the cutter means 7 is rotated by the engine 9 in the direction of the arrow shown in FIG. 21, a clutch is provided at the output side of the engine 9 to hold the motor 10 in operation by the dynamo for running on the road with the cutter means 7 held at rest.

FIG. 26 shows an embodiment wherein the cutter means 7 is driven about a vertical axis by the output of the engine 9 which is delivered to the cutter means through wrapper connector driving means 164. The motor 10 is mounted in an upright position on the top of a transmission case 165 for reversibly rotating the running means 8 through a pinion 166 meshing with a gear 167. Indicated at 168 in FIG. 26 is a fuel tank for the engine.

The flex angle adjusting means for angularly adjusting the cutter means relative to the running means and locking the cutter means in the adjustingly shifted position has its pivot 108 positioned at the lowest possible level as shown in FIG. 20. This diminishes the likelihood that the angular adjustment (90 degrees in the case of the embodiment), if made, will not upset the relation between the cutter means 7 and the running means 8. Further the adjusting holes 109 can be replaced by a circular-arc slot centered about the pivot 108, for use in combination with a bolt substituting for the lock pin 111.

The second embodiment will be used in the following manner for cutting grass, weeds or the like.

FIG. 24 shows the cutter-trimmer with its running means 8 set in the lateral position. In this state, the positioning lever 138 of the positioning assembly is engaged in the recess 143, and the tubular shaft 124 is held locked to the transmission case 101, with the drive wheels 137 in lateral position.

For working, the wheels 137 are placed on the ground, and the operator grasping the pair of grips 58 of the handle 6 holds the device from falling sideways. With the cutter means 7 held in rotation by the power from the engine 9, the front portion of the device is reciprocatingly moved rightward and leftward by suitably operating the forward-reverse switch for the motor 9 to cut grass with the cutter means 7 in rotation. The motor 10, when driven forward, forwardly rotates the drive wheels 137 about a horizontal axis in the front-to-rear direction through the output shaft 121, bevel gear mechanisms 118, 131 and axle 134, thereby moving the front portion of the device sideway (leftward) and permitting the rotating cutter means 8 to cut weeds or the like. Upon the device traveling leftward to a desired position, the motor 10 is brought into reverse rotation to reversely rotate the wheels 137 through the above transmission system. Consequently, the front portion of the device moves rightward to similarly cut weeds or the like by the rotation of the cutter means 7.

Figure 29:
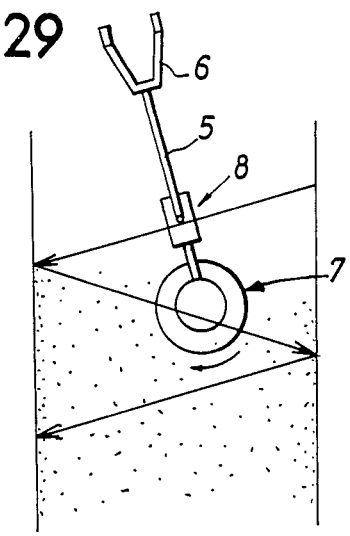

While the axle 134 is oriented in the front-rear direction in the above operation, the operator slightly deflects the handle 6 sideways with forward-to-reverse and reverse-to-forward changes in the direction of the wheels 137, whereby the wheels 137 can be made to advance in oblique directions while traveling sideways, with the result that the device advances in a zigzag to cut grass over an area of predetermined width as seen in FIG. 29.

Figure 27:
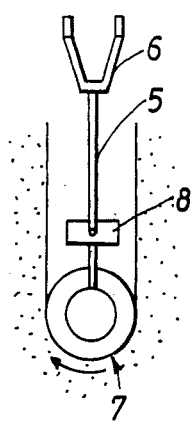
FIGS. 27 to 30 are diagrams illustrating the second embodiment in different modes of operation.

To cut grass while moving the cutter-trimmer forward or rearward, the wheels 137 are shifted to the forward position. With reference to FIG. 24 showing the wheels 137 in the lateral position, the positioning lever 138 is first released from the recess 143 against the spring 144 for unlocking, and turned through about 90 degrees relative to the transmission case 101 in the direction of arrow J in FIG. 21 by moving the handle 6. This causes the tubular shaft 124 to shift the wheels 137 from lateral position to forward position, whereupon the lever 138 is engaged in the other recess 142 and thereby locked against rotation. The wheels 137 are now in the forward position shown in FIG. 19, with the axle 134 oriented laterally. Since the wheels 137 advance when forwardly rotated, grass or weeds can be cut with the cutter means 7 at the front side thereof as shown in FIG. 27.

Figure 28:
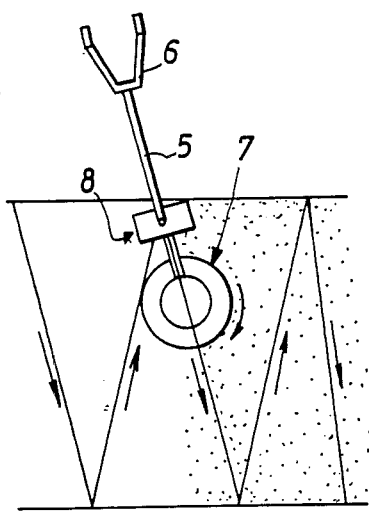

When the handle 6 is slightly deflected rightward or leftward upon a change in the direction of rotation of the motor 10 in this state, the device can be advanced rightward or leftward in a zigzag while traveling forward or rearward as seen in FIG. 28.

Figure 30:
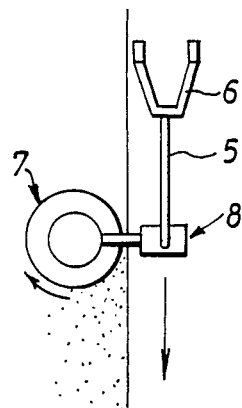

Further when the guide handle 6 is turned from position III to position IV as indicated in a phantom line in FIG. 21, the cutter means 7 is positioned at one side of the running means 8 in a laterally projecting state. If the wheels 137 are then advanced, grass can be cut at one side of the device as seen in FIG. 30.

When the hand lever 116 is grasped in this side cutting state, causing the wire 115 to pull out the lock pin 111 against the spring 114, the connecting arms 107 are released from the bracket plate 104, allowing the cutter means 7 to move down in the direction of arrow shown in FIG. 20 about the pivot 108, whereby the cutter means 7 is positioned along a slope as shown in FIG. 25. The lock pin 111 is then inserted into the desired one of the adjusting holes 109 to lock the cutter means in the angularly shifted position.

The drive wheels 137, then advanced, permits the cutter means to cut grass on the slope along the ridge.

With the cutter means 7 thus positioned along the slope, the handle 6 can be set in the position III, with the wheels 137 in the solid-line position of FIG. 21, to perform a cutting operation.

The cutter means 7 along the slope can be returned to the initial position by pushing the engine 9 downward.

According to the invention described above, the running means reversibly rotatable about a horizontal axis and supporting the body of the cutter-trimmer is disposed in the vicinity of the cutter means to lessen the burden on the user holding the guide handle.

The cutter means driving engine and the running means driving electric motor are disposed at a longitudinally intermediate portion of the body toward its front end. This arrangement holds the device in good balance under gravity longitudinally thereof, rendering the handle easy to manipulate. Since the running means is driven by an electric motor, the direction of rotation thereof is very easy to change.

The cutter means is in the form of a disk having a toothed outer peripheral portion and an upwardly recessed central portion, in which the running means is disposed. The arrangement is therefore compact, further permitting the running means to pass over the grass-cut area without the likelihood of causing damage to lawns or the like.

The cutter means is disposed at the front end of the cutter-trimmer body, and the running means is disposed in the rear of the cutter means in proximity thereto, with the electric motor for the running means interposed between these means. A transmission case provided above the running means has housed therein a gear transmission operatively connected to the motor, while the engine for the cutter means is disposed above the transmission case Because of this arrangement, the cutter-trimmer can be reliably supported by the running means against gravity. Because of this feature and further because the running means is of the single-axle two-wheel type, the cutter-trimmer is easy to steer or guide along.

The present device is further provided with at least one stabilizing ground engaging member which is held out of contact with the ground while the cutter means is in rotation on a horizontal plane but is in contact with the ground when the cutter means is in rotation on an inclined plane to prevent the cutter means from scalping the ground. Consequently, the cutter means is less likely to become damaged early and to cut roots of the lawn or the like. This assures sound growth of the lawn or the like without locally withering the grass.

The electric motor is energized by the dynamo of the engine and is given forward and reverse instructions by a motor control circuit which is operated by a switch on the guide handle. The motor is therefore readily amenable to remote control. The circuit includes signal generating means for producing forward and reverse instruction signals alternately with a predetermined period. The device can therefore be automatically driven in reciprocation for a cutting operation.

In addition to the motor control circuit for reversibly rotating the motor, a speed change unit is also provided which comprises a speed setting variable resistor and a speed change circuit for giving an instruction to the motor control circuit. Accordingly, the speed of travel of the cutter-trimmer is also controllable for a more accurate and efficient cutting operation.

The course directing means for selectively shifting the running means to a forward position or to a lateral position about a vertical axis and holding the running means in the shifted position enables the cutter means to cut grass while reciprocatingly traveling forward and rearward, or rightward and leftward, so that grass, weeds or the like can be cut in accordance with the growth thereof or with work conditions.

The flex angle adjusting means for angularly adjusting the cutter means upward or downward relative to the running means and locking the cutter means in the adjusted position permits the cutter means to cut grass on a slope.

A Bowden wire is provided for releasably holding the adjusting means in its locking position and is operable from the guide handle. This leads to the advantage that the cutter means is shiftable by remote control even for the cutting operation on slopes.

The handle turning-locking means for turning the guide handle to a rearward position or to a sideways position relative to the body and locking the handle in the turned position enables the present device to perform a forward cutting operation with the cutter and running means positioned to the front of the handle, and also a sideways cutting operation with the running means positioned to the front of the handle and the cutter means at one side thereof. Consequently, the cutting operation can be carried out suitably in conformity with the work conditions.

What is claimed is:

1. A cutter-trimmer of the walk-behind type including drivingly rotatable cutter means disposed at the front end of the body thereof and a guide handle disposed at the rear end of the body, the cutter-trimmer comprising:
    running means disposed in the vicinity of the cutter means and reversibly rotatable about a horizontal axis for supporting the body thereon;
    a cutter means driving engine and a running means driving motor provided at a longitudinally intermediate portion of the body toward its front end;
    a transmission case having bevel gear means for rotating the cutter means, said transmission case being provided above the cutter means; and
    a connecting tube extending from the transmission case rearwardly and upwardly in an inclined position, the engine being attached to an upper end of the connecting tube, the connecting tube having a transmission shaft inserted therethrough for operatively connecting the engine to the bevel gear means.

2. The cutter-trimmer as defined in claim 1 wherein the cutter means is in the form of a disk having a toothed outer peripheral portion and an upwardly recessed central portion, and the running means is disposed in the upwardly recessed portion.

3. The cutter-trimmer as defined in claim 1 wherein the cutter means is in the form of a disk having a toothed outer peripheral portion, and the running means is disposed in the rear of the cutter means in proximity thereto.

4. The cutter-trimmer as defined in claim 1, wherein the cutter means is disposed at the front end of the body, and the running means is disposed rearwardly of the cutter means and in proximity thereto, the motor being interposed between the cutter means and the running means, a transmission case being disposed above the running means and having housed therein gear transmission means operatively connected to the motor, the engine being disposed above the transmission case.

5. The cutter-trimmer as defined in claim 1 wherein the running means is of the single-axle two-wheel type and comprises an axle and two wheels of the same diameter mounted o the respective ends of the axle, a bevel gear mechanism being provided between the wheels and partitioned from outside for driving the axle.

6. The cutter-trimmer as defined in claim 1 wherein a stabilizing ground engaging member is held out of contact with the ground while the cutter means is in rotation on a horizontal plane but is in contact with the ground when the cutter means is in rotation on an inclined plane to prevent the cutter means from scalping the ground.

7. The cutter-trimmer as defined in claim 1 wherein the dynamo of the engine supplies a current to the electric motor and which comprises a motor control circuit for giving forward and reverse rotation instructions to the motor, a switch being mounted on the guide handle for operating the circuit.

8. The cutter-trimmer as defined in claim 1 which comprises a motor control circuit for reversibly rotating the electric motor, the circuit including signal generating means for giving forward and reverse rotation instructions alternately for a predetermined period.

9. The cutter-trimmer as defined in claim 1 wherein a motor control circuit for reversibly rotating the electric motor is provided with means for giving forward and reverse rotation instructions alternately as manually selected and means for giving forward and reverse rotation instruction alternately as automatically selected for a predetermined period, and a manual-automatic change switch is mounted on the guide handle.

10. The cutter-trimmer as defined in claim 1 which includes a motor control circuit for reversibly rotating the electric motor, and a speed change unit comprising a speed setting variable resistor and a speed change circuit, and the speed change unit gives an instruction to the motor control circuit.

11. A cutter-trimmer of the walk-behind type including drivingly rotatable cutter means disposed at the front end of the body thereof and a guide handle disposed at the rear end of the body, the cutter-trimmer comprising:

running means disposed in the vicinity of the cutter means and drivingly rotatable about a horizontal axis for supporting the body thereon;

drive means provided at a longitudinally intermediate portion of the body toward its front end for driving the cutter means and the running means;

course directing means for selectively shifting the running means to a forward position or to a lateral position about a vertical axis and holding the running means in the shifted position;

a transmission case having bevel gear means for rotating the cutter means, said transmission case being provided above the cutter means; and a connecting tube extending from the transmission case rearwardly and upwardly in an inclined position, a cutter means driving engine being attached to the upper end of the connecting tube, the connecting tube having a transmission shaft inserted therethrough for operatively connecting the engine to the bevel gear means.

12. The cutter-trimmer as defined in claim 11 wherein the cutter means is in the form of a disk having a toothed outer peripheral portion and an upwardly recessed central portion, and the running means is disposed in the upwardly recessed portion.

13. The cutter-trimmer as defined in claim 11 wherein the cutter means is in the form of a disk having a toothed outer peripheral portion, and the running means is disposed rearwardly of the cutter means in proximity thereto.

14. The cutter-trimmer as defined in claim 11 wherein the cutter means is disposed at the front end of the body, and the running means is disposed rearwardly of the cutter means in proximity thereto, a running means driving electric motor being interposed between the cutter means and the running means, a transmission case being disposed above the running means and having housed therein gear transmission means operatively connected to the motor, a cutter means driving engine being disposed above the transmission case.

15. The cutter-trimmer as defined in claim 11 wherein the running means is of the single-axle two wheel type and comprises an axle and two wheels of the same diameter mounted on the respective ends of the axle, a bevel gear mechanism being provided between the wheels and partitioned from outside for driving the axle.

16. The cutter-trimmer as defined in claim 11 wherein a stabilizing ground engaging member is held out of contact with the ground while the cutter means is in rotation on a horizontal plane but is in contact with the ground when the cutter means is in rotation on an inclined plate to prevent the cutter means from scalping the ground.

17. The cutter-trimmer as defined in claim wherein the transmission case is provided with the course directing means comprising a positioning pin biased toward an engaging direction by a spring.

18. The cutter-trimmer as defined in claim 11 wherein a transmission case having gear means for driving the running means is provided above the running means, and the transmission case is provided with a vertical connecting tubular member rotatable about a vertical axis relative to the case for supporting the running means, the tubular member having inserted therethrough a transmission shaft for driving the running means through the gear means, the tubular member being provided with a shift lever movable from the handle side for shifting the running means, a positioning member being attached to the transmission case for holding the shift lever in the forward position or the lateral position of the running means.

19. A cutter-trimmer of the walk-behind type including drivingly rotatable cutter means disposed at the front end of the body thereof and a guide handle disposed at the rear end of the body, the cutter-trimmer comprising:

running means supporting the body thereon and reversibly rotatable about a horizontal axis, the running means being disposed toward the body front end to the rear of the cutter means at a small distance therefrom;

a engine for driving the cutter means;

a motor for driving the running means;

flex angle adjusting means for angularly adjusting the cutter means upward or downward and locking the cutter means at the adjusted angle;

a transmission case having bevel gear means for rotating the cutter means, said transmission case being provided above the cutter means; and a connecting tube extending from the transmission case rearwardly and upwardly in an inclined position, the engine for driving the cutter being attached to the upper end of the connection tube, the connecting tube having a transmission shaft inserted therethrough for operatively connecting the engine to the bevel gear means.

20. The cutter-trimmer as defined in claim 19 wherein the motor is interposed between the cutter means and the running means, and the flex angle adjusting means is provided at one side of the motor.

21. The cutter-trimmer as defined in claim 19 wherein the running means is of the single-axle two-wheel type and comprises an axle and two wheels of the same diameter mounted on the respective ends of the axle, a bevel gear mechanism being provided between the wheels and partitioned from outside for driving the axle.

22. The cutter-trimmer as defined in claim 19 wherein a stabilizing ground engaging member is held out of contact with the ground while the cutter means is in rotation on a horizontal plane but is in contact with the ground when the cutter means is in rotation on an inclined plate to prevent the cutter means from scalping the ground.

23. The cutter-trimmer as defined in claim 19 wherein the dynamo of the engine supplies a current to the electric motor and which comprises a motor control circuit for giving forward and reverse rotation instructions to the motor, a switch being mounted on the guide handle for operating the circuit.

24. The cutter-trimmer as defined in claim 19 wherein the flex angle adjusting means is provided between the cutter means and the running means, and the adjusting means has a pivot positionable close to the ground surface for rendering the cutter means angularly adjustable upward or downward about the pivot, lock holes arranged on a circular arc centered about the pivot for holding the cutter means in the angularly adjusted position, and a lock pin removably engageable in the lock holes.

25. The cutter-trimmer as defined in claim 19 wherein the flex angle adjusting means is provided between the cutter means and the running means and which includes a Bowden wire for releasably holding the adjusting means in its locking position, the Bowden wire being operable from the guide handle.

26. The cutter-trimmer as defined in claim 19 wherein the cutter means is adjustingly positionable by the adjusting means in a desired angular range from a horizontal cutting position wherein the cutter means rotates in a horizontal plane to a cutting position wherein the cutter means rotates in a downward vertical plane, the engine being positioned above the running means when the cutter means is in its horizontal cutting position, the engine being positioned above the space between the cutter means and the running means when the cutter means is in a downwardly inclined cutting position.

27. The cutter-trimmer as defined in claim 19 wherein the flex angle adjusting means has a pivot for angularly shifting the cutter means upward or downward, and the cutter means has its center of gravity positioned forwardly of the pivot when the cutter means is in rotation on a horizontal plane, the cutter means being shiftable to a downwardly inclined position when the adjusting means is released from its locking position.

28. A cutter-trimmer of the walk-behind type including drivingly rotatable cutter means disposed at the front end of the body thereof and guide handle disposed at the rear end of the body, the cutter-trimmer comprising:
   running means supporting the body thereon and being reversibly rotatable about a horizontal axis, the running means being disposed toward the body front end and to rear of the cutter means at a small distance therefrom;
   an engine for driving the cutter means;
   a motor for driving the running means; and
   handle turning-locking means for turning the guide handle to a rearward position or to a sideways position relative to the body and locking the handle in the turned position.

29. The cutter-trimmer as defined in claim 28 wherein the running means is of the single-axle two-wheel type and comprises an axle and two wheels of the same diameter mounted on the respective ends of the axle, a bevel gear mechanism being provided between the wheels and partitioned from outside for driving the axle.

30. The cutter-trimmer as defined in claim 28 wherein a stabilizing ground engaging member is held out of contact with the ground while the cutter means is in rotation on a horizontal plane but is in contact with the ground when the cutter means is in rotation on an inclined plate to prevent the cutter means from scalping the ground.

31. The cutter-trimmer as defined in claim 28 wherein a transmission case having bevel gear means for rotating the cutter means is provided above the cutter means, and a connecting tube extends from the transmission case rearwardly upward in an inclined position, a cutter means driving engine being attached to the upper end of the connecting tube, the connecting tube having inserted therethrough a transmission shaft operatively connecting the engine to the bevel gear means.

32. The cutter-trimmer as defined in claim 28 wherein the dynamo of the engine supplies a current to the electric motor and which comprises a motor control circuit for giving forward and reverse rotation instructions to the motor, a switch being mounted on the guide handle for operating the circuit.

33. The cutter-trimmer as defined in claim 28 wherein a transmission case having gear transmission means to be driven by the electric motor is provided above the running means, and the running means is driven through the gear transmission means within the case, the engine being disposed above the transmission case, the guide handle being connected to the transmission case by the turning-locking means, the guide handle being turnable without interfering with the engine.

34. The cutter-trimmer as defined in claim 28 wherein a transmission case having gear transmission means to be driven by the electric motor is provided above the running means, and the running means is driven through the gear transmission means within the case, the transmission case being provided with a handle holder rotatable about a vertical axis but immovable upward or downward, the handle holder having attached thereto a guide plate formed with a circular-arc guide slot centered about the vertical axis, the guide slot having a lock bolt tightly or loosely attachable to the transmission case, the guide handle being attached to the handle holder.

35. The cutter-trimmer as defined in claim 28 wherein when the guide handle is in the rearward position, the running means is movable forward, rearward or sideways to cause the cutter means in front of the running means to perform a cutting operation, and when the guide handle is in the sideways position, the cutter means is positioned at one side of the handle outwardly thereof to perform a sideways cutting operation with the advance of the running means.

* * * * *